United States Patent [19]

Barasch et al.

[11] 4,038,916

[45] Aug. 2, 1977

[54] ELECTROSTATIC IMAGING APPARATUS

[75] Inventors: Stephen Barasch, Southfield; Richard C. Fedder, Detroit, both of Mich.

[73] Assignee: Burroughs Corporation, Detroit, Mich.

[21] Appl. No.: 630,682

[22] Filed: Nov. 10, 1975

[51] Int. Cl.[2] .......... G01D 15/06

[52] U.S. Cl. .......... 101/1; 101/122

[58] Field of Search .......... 101/1, 114, 116, 119–122, 101/DIG. 13; 346/74 ES, 74 EE, 74 EN, 74 EK, 74 EB, 74 J; 178/6.6 A

[56] References Cited

U.S. PATENT DOCUMENTS

| | | | |
|---|---|---|---|
| 2,930,847 | 3/1960 | Metzger | 101/DIG. 13 |
| 2,944,147 | 7/1960 | Bolton | 250/49.5 |
| 3,234,904 | 2/1966 | Von Wagner | 101/93.4 X |
| 3,261,284 | 7/1966 | Lynott et al. | 101/114 |
| 3,277,818 | 10/1966 | Cone | 346/74 J X |
| 3,314,360 | 4/1967 | Foster | 101/122 |
| 3,321,768 | 5/1967 | Byrd | 346/74 |
| 3,647,291 | 3/1972 | Pressman et al. | 355/3 |
| 3,779,166 | 12/1973 | Pressman et al. | 101/114 X |

*Primary Examiner*—Edward M. Coven
*Attorney, Agent, or Firm*—Robert J. Gaybrick; Edward J. Feeney, Jr.; Kevin R. Peterson

[57] ABSTRACT

An apparatus for forming solid character charge patterns on a dielectric surface in a non-impact printing system. The apparatus comprises a corona source of ions and a rotatable stencil drum surrounding the corona source to shape the ions generated by the corona source and accelerated therefrom by electrostatic forces into solid patterns of charge. A coaxial stationary shield is provided surrounding the stencil drum to capture the solid patterns of charge. A series of grid covered openings are longitudinally disposed along the shield to form a print station. Means are provided to electrically bias the individual grids covering the openings in the shield at a potential which either blocks the passage or enhances the transmission of patterns of charge through the shield onto an adjacent dielectric surface.

12 Claims, 2 Drawing Figures

ELECTROSTATIC IMAGING APPARATUS

BACKGROUND OF THE INVENTION

The present invention generally relates to the controlled flow of ions through character forming means to form solid character electrostatic charge patterns on a dielectric surface. Specifically the invention relates to a non-impact electrostatic printer particularly useful for high-speed production of printed output in a data processing environment.

Increasing amounts of statistical and informational data have become instantly available through the rapid technological advancement and widespread application of data processing systems. This data has been found most useful when organized into printed forms. These forms or reports are appropriately distributed within businesses and organizations to serve as records, reference materials, and decision-making aids. Prior art printing devices utilized in preparing these reports primarily employ electro-mechanically actuated printing means such as solenoid actuated print hammers used in conjunction with constantly rotating print wheels and belts. These prior art devices accomplish printing by impacting the print hammers against a moving web and ink ribbon placed in juxtaposition to the character dies. The inertial characteristic and other mechanical properties of the prior art devices have limited their print rate to levels far below the rate at which contemporary computer systems can provide data. The electro-mechanical mechanisms employed in these prior art printers are often subject to failure and breakdown and result in the loss of the use of the printer to the computer system.

To overcome the deficiencies in speed and reliablility of impact printers, non-impact printing devices have been developed which employ electrostatic printing expedients. These prior art devices primarily employ one of two techniques for forming solid character charge images on a dielectric surface. The first technique comprises a movable dielectric web positioned between a plurality of solid character-shaped electrodes and a backing electrode. U.S. Pat. No. 3,234,904 issued to Wagner discloses an electrostatic printer of this type whereby selective pulsing of the solid character electrodes in coordination with a pulsed backing electrode deposits solid character charge images on dielectric web. These charge images are subsequently toned and fused to accomplish permanent printing.

A second technique utilized in non-impact printing employs an endless stencil with character-shaped apertures formed thereon. The stencil is interposed between a plurality of discharge electrodes and a dielectric web. U.S. Pat. No. 3,314,360 issued to Forster discloses such an apparatus whereby clouds of ions selectively emitted from the discharge electrodes are shaped into solid character charge patterns by passing through the stencil. The charge patterns are included to impinge on the dielectric web by attraction to an electrically modulated backing electrode which is positioned behind the web. Again, the charge images are toned and fused to accomplish permanent printing.

The prior art non-impact solid character electrostatic printers obviate many of the speed and reliability problems attendant with the electro-mechanical impact printers. However, there exist disadvantages inherent in these prior art non-impact solid character printers. One disadvantage of the solid character electrode devices is that the ionization breakdwon voltage of the discharge electrodes is critically dependent upon the magnitude of the air-gap separation betweeen the discharge electrodes and the backing electrode. A slight variation in electrode separation will result in a significant deterioration of the print quality. Variations could comonly arise from lack of uniformity in web thickness or improper printer adjustments.

Another problem commmon to prior art devices is a limitation on the printer design configurations because of the requirement that a backing electrode be positioned closely behind the print receiving web to attract the charge character patterns onto the web. Also, prior art devices which employ a backing electrode require complex circuitry to actuate the discharge electrodes and the backing electrode in proper synchronization. Such cicuitry decreases the reliability of the prior art devices and significantly increases the cost of production and maintenance. Attempts to provide straight pulsed discharge electrode devices have proved inefficient because of the high voltage pulses required to form charge images on the image receiving surface.

Summary of the Invention

In order to overcome the above-mentioned shortcomings of the prior art the present invention is provided with novel features which accomplish desired advantages.

It is therefore an object of this invention to provide a simple and economical high-speed non-impact electrostatic imaging apparatus capable of reliably forming distinct solid character charge images on a dielectric surface.

It is a further object of this invention to provide a high-speed non-impact electrostatic imaging apparatus wherein the quality of the print produced is not dependent upon the separation between discharge electrodes and a backing electrode.

Another object of the invention is to provide a high-speed non-impact electrostatic imaging apparatus wherein the need for a backing electrode is eliminated, thereby enhancing simplicity and flexibility in printer design.

Still another object of this invention is to provide a high-speed non-impact electrostatic imaging apparatus which attains high printing rates through the controlled flow of ions through an endless character forming means, stencil or the like to form distinct solid character charge patterns on a dielectric surface.

The solid character electrostatic imaging apparatus of the present invention achieves these and other objects by employing an endless character forming means to form a controlled flow of ions from a corona source into solid charge patterns of characters. A shield is provided to capture these charge patterns except along a print station formed by series of openings in the shield through which the charge patterns may pass and impinge upon an adjacent dielectric surface after passing through electrically conductive grids. Such electrically conductive grids are provided within each opening to either enhance or inhibit the transmission of charge patterns through the openings depending upon the magnitude and polarity of the voltages applied to the grids. Printing is thus accomplished by the selective formation of solid character charge patterns on a dielectric surface and the subsequent toning and transfer of the charge patterns to paper.

BRIEF DESCRIPTION OF THE DRAWING

The foregoing objects, features and advantages of the invention, along with other objects and advantages which may be obtained by its use, will be apparent from the following detailed description when read in conjunction with the accompanying drawing wherein.

DETAILED DESCRIPTION OF THE PREFERRED EMBODIMENT

Figure 1:
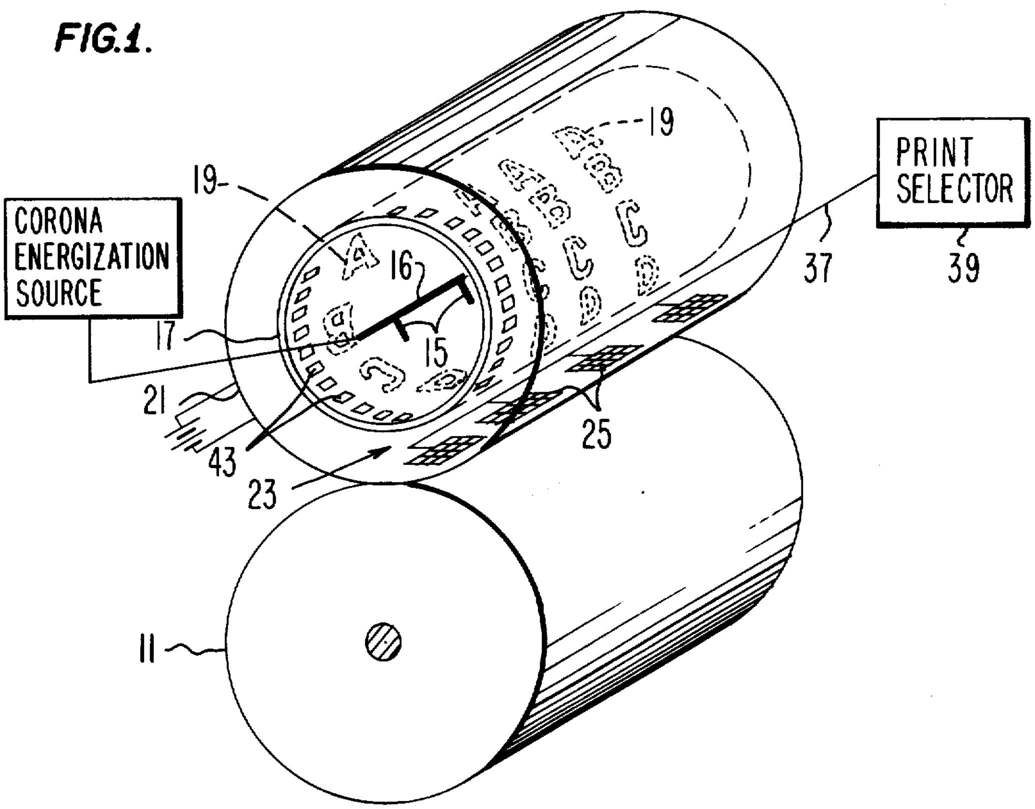
FIG. 1 is a perspective view which shows the structural relationship of the integral components.

Referring more particularly to the drawings, FIG. 1 exhibits the electrostatic printing apparatus which includes a dielectric drum 11 positioned adjacent to the electrostatic imaging apparatus. The electrostatic imaging apparatus includes a linear array of uniformly spaced corona pins 15 which will produce ion clouds when provided with an appropriate current. The corona pins 15 are mounted on a support bar 16 and are oriented to direct the ion clouds in a common direction. A corona wire or similar source of ions could be employed in place of the individual corona pins 15, but such alternatives have generally proven to be much less efficient because they produce ion flows in all directions and therefore require more current to provide the same charge density as the directed flows of the corona pins 15. It is intended that conventional means known in the art be employed to supply the proper current to the corona pins 15.

A rotatable stencil drum 17 surrounds the linear array of corona pins 15. A plurality of apertures 19 are etched through the surface of the drum 17 to form stencils of characters commonly employed in printing. The character shaped apertures or stencils 19 are arranged in uniformly spaced columns and rows on the surface of the drum 17. Each column of character shaped stencils 19 is horizontally aligned with a respective corona pin 15. The ion clouds which emanate from the corona pins 15 are accelerated therefrom by interacting electrostatic forces. The ion clouds pass through the character shaped stencils 19 and are thereby formed in solid character patterns of charge. Rotation of the drum 17 will sequentially position all rows of character shaped stencils 19 in horizontal alignment with respective corona pins 15 to thereby produce solid character charge patterns of all characters commonly employed in printing.

A stationary metal shield 21 surrounds the stencil drum 17 and captures the solid character charge patterns flowing from the stencil drum 17. This shield 21 is electrically conductive and is maintained at a potential sufficient to attract the solid character charge patterns toward its surface. Maintaining the shield 21 at a potential with respect to the corona pins 15 further directs more current through the character shaped stencils 19 etched through the metal drum 17 and increases the efficiency of the corona pins 15.

The electrostatic image forming apparatus further includes a print station 23 comprising a linear array of openings 25 in the shield 21. The openings 25 are in 1-1 correspondence and horizontal alignment with the columns of character shaped stencils 19 and the corona pins 15. The openings 25 are closely spaced and comprise the print line of the electrostatic printing apparatus by permitting the solid character charge patterns to pass through the shield 21 and impinge on an adjacent dielectric surface such as drum 11. Disposed within each opening 25 is a reference grid 27 and control grid 29 comprises parallel lengths of fine conductive wire mounted over a central aperture in a printed circuit (PC) board 31. The lengths of wire in each reference grid 27 are mounted in the PC board 31 spaced from and perpendicular to the lengths of wire in the corresponding control grid 29. The PC board 31 electrically isolates the reference grids 27 and control grids 29 from each other and from the shield 21.

Figure 2:
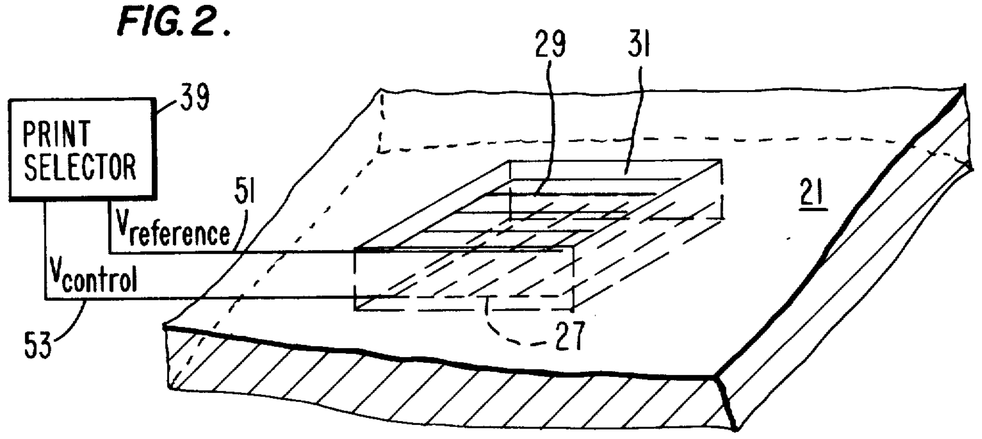
FIG. 2 is a detailed view of one of the grids shown in FIG. 1.

The reference grids 27 and control grids 29 are electrically modulatable to control the electric field within the openings 25 and thus enhance or inhibit the transmission of solid character charge patterns through the openings 25 in the shield 21. This control over the passage of charged character patterns through the openings 25 is accomplished by biasing the reference grids 27 with a common reference voltage. The reference voltage is supplied to the reference grids 27 over a common lead connected to a suitable reference voltage source. In the detailed view of an opening 25 in the shield 21 depicted in FIG. 2 the reference voltage is shown to be supplied by the print selector 39 over a selector lead. The selector lead in this instance is line $V_{reference}$ designated as 51 which connects the reference grid 27 with a suitable reference voltage source included in print selector 39. The control grids 29 are normally biased at an appropriate voltage with respect to the reference voltage to block the passage of solid character charge patterns through the openings 25 in the shield 21. The control grids 29 are biased individually by the print selector 39 over selector leads 37 to provide selective control over each print position in the print line. The control grid 27 is biased over a selector disignated as $V_{control}$, line 53 in FIG. 2.

The print selector generally designated as 39 and known in the art as representatively seen in U.S. Pat. No. 3,314,360, controls the selective biasing of the individual control grids 29 at the correct times and with the proper voltage to permit the transmission of the desired solid character charge patterns through the proper openings 25 in the shield 19. To this end, the rotating drum 17 has formed on its surface a timing track comprising timing slots 43 etched through the surface of the drum 17 and spaced uniformly about its circumference. Appropriate timing signals can be provided by placing a lamp on one side of the drum 17 and sensing, with photocells or any similar device, the light passing through the timing slots 43. Timing circuitry provided within the print selector 39 is capable of decoding the timing signals and thus determining the relative position of the character stencils 19 with respect to the openings 25 in shield 21. Also within the print selector 39 is biasing circuitry which coordinates with the timing circuitry to bias the proper control grids 29 in predetermined timed relationships to permit the solid character charge patterns of characters to be printed to pass through the openings 25 in the print station 23. This biasing occurs simultaneously with the proper alignment of character stencils 19 and openings 25. The solid character charge patterns are thereby transmitted through the openings 25 and impinge on an adjacent dielectric surface 11. The particular timing and biasing circuitry encompassed within the print selector 39 is not the subject of the present invention and may be accomplished by means known to those skilled in the electrical arts.

The dielectric surface comprises a drum 11 coated with an appropriate dielectric material. The drum 11 is rotated tangentially past the print station 23 to provide for the proper placement of the solid character charge patterns. The charge patterns formed may be transferred to paper and toned by means well-known in the art during that part of the rotation of the drum 11 past the print station 23. A cleaning and erasing station may be employed to continuously prepare the previously used surface of the drum 11 for receiving futher solid character charge patterns.

In summary, the electrostatic imaging apparatus of the instant invention forms solid charge patterns of printable characters by the controlled flow of ions through a character forming means. Ions generated by a corona source and accelerated therefrom by electrostatic forces pass through character-shaped stencils formed through the surface of a rotatable cyclindrical drum which surrounds the corona source. Stencils of all characters commonly employed in printing are formed in columns and rows on the drum and in this manner charge patterns of these characters are continuously formed. A stationary shield surrounds the stencil drum to capture the flowing charge patterns. A linear array of openings are provided through the shield in horizontal alignment with the columns of stencils to form means whereby charge patterns may pass through the shield. Electrically conductive grids are singly disposed within these openings and means are provided to selectively bias the grids with potentials that either enhance or inhibit the transmission of charge patterns through the openings in the shield and onto an adjacent dielectric surface. Permanent printing is accomplished by the subsequent toning and transfer to paper of the charge images formed on the dielectric surface.

While only a preferred embodiment of this invention has been described and illustrated, it is apparent that modifications and alterations may be made therein which would also accomplish the desired results. It is therefore the intention of the appended claims to include the various changes that could be made by those skilled in the art without departing from the scope and spirit of the invention.

What is claimed is:

1. A solid character electrostatic imaging apparatus for forming electrostatic solid character charge patterns on a dielectric surface comprising:

corona means for generating ions and electrostatically accelerating said ions away therefrom;

rotatable endless character forming means for forming said accelerated ions into a plurality of solid patterns of charge;

stationary shield means surrounding said corona means and said character forming means, said shield means separating said character forming means from said dielectric surface, said stationary shield means having an array of openings therethrough positioned in the path of said solid patterns of charge;

a plurality of conductive grids one of which is disposed in each of said openings; and means for selectively biasing each of said grids individually into one of two states, said first state confines said solid patterns of charge within said stationary shield means and said second state transmits said patterns of charge through said openings in said shield means, whereby extraneous solid patterns of charge are confined within said shield means and solid patterns of charge selected for printing are transmitted through the openings in the shield to impinge upon the dielectric surface.

2. The electrostatic imaging apparatus of claim 1 wherein said corona means comrpises:

support means disposed within said endless character forming means;

a plurality of corona pins mounted on said support means in a longitudinally spaced relationship; and means for supplying current to said corona pins.

3. The electrostatic imaging apparatus of cliam 2 wherein said rotatable endless character forming means comprises a stencil means.

4. The electrostatic imaging apparatus of claim 3 wherein said stencil means comprises a cylindrical drum surrounding said support means, said drum having an inner surface proximate said corona pins and an outer surface remote therefrom.

5. The electrostatic imaging apparatus of claim 4 wherein said cyclindrical drum has shaped apertures extending from said inner surface to said outer surface, said apertures being arranged in columns and rows on said drum, each of said columns of apertures being aligned with respective corona pins.

6. The electrostatic imaging apparatus of claim 5 wherein said electrically conductive grids are electrically isolated from said shield means.

7. The electrostatic imaging apparatus of claim 6 wherein said shield means comprises a conductive cylinder surrounding said rotatable drum.

8. The electrostatic imaging apparatus of claim 6 wherein said shield means is biased at a potential with respect to said corona pins to attract said solid patterns of charge.

9. The solid character electrostatic imaging apparatus comprising:

corona means for generating ions and electrostatically accelerating said ions therefrom;

endless rotatable stencil means surrounding said corona means for forming said accelerated ions into solid patterns of charge;

shield means surrounding said corona means and said stencil means, said shield means having a longitudinal array of openings positioned in the path of said solid patterns of charge to permit said solid patterns of charge to pass therethrough;

a plurality of electrically conductive means one of which is disposed in each of said openings and adapted to either electrically block the passage of solid patterns of charge through said openings or electrically permit the transmission of said solid patterns of charge through said openings;

means for selectively biasing said plurality of electrically conductive means into either an electrically blocking or electrically transmitting state; and means positioned outside of said shield means and aligned with said array of openings for receiving transmitted solid character charge patterns, wherby solid character charge patterns may be selected either for transmission through said openings in said shield means and reception by said receiving means or for confinement within said shield means.

10. The electrostatic imaging apparatus of claim 9 wherein said electrically conductive means comprises a multi-layered grid mounted in electrical isolation from said shield means.

11. A solid character electrostatic imaging apparatus comprising:

- a corona source of ions;
- a rotatable cylindrical drum surrounding said corona source, said drum having shaped apertures arranged in rows and columns and adapted to shape ions emanating from said corona source into solid charge patterns;
- a stationary cylindrical shield surrounding the drum, said shield adapted to confine charge patterns from passing beyond the radius of said shield;
- a plurality of openings disposed in a row on the surface of said shield and aligned with said aperture columns on said cylindrical drum;
- a plurality of electrially conductive grids one of which is disposed in each of said openings; and
- means for selectively applying a voltage to said grids whereby said grids are maintained in one of two states, said first state repelling charge patterns from said grids, said second state transmitting charge patterns through said grids.

12. The electrostatic imaging apparatus of claim 11 further including a dielectric surface positioned adjacent to said cyclindrical shield whereby charge patterns which pass through said openings impinge upon said dielectric surface and form electrostatic patterns thereon.

* * * * *